US007876355B2

(12) United States Patent
Stevens

(10) Patent No.: US 7,876,355 B2
(45) Date of Patent: Jan. 25, 2011

(54) VIDEO ABNORMALITY DETECTION

(75) Inventor: Douglas C. Stevens, Portland, OR (US)

(73) Assignee: Harmonic Inc., San Jose, CA (US)

( * ) Notice: Subject to any disclaimer, the term of this patent is extended or adjusted under 35 U.S.C. 154(b) by 1318 days.

(21) Appl. No.: 11/405,928

(22) Filed: Apr. 17, 2006

(65) Prior Publication Data

US 2007/0242163 A1    Oct. 18, 2007

(51) Int. Cl.
*H04N 17/00* (2006.01)
(52) U.S. Cl. .................. 348/180; 348/615; 348/559; 348/189; 348/700; 348/701
(58) Field of Classification Search .............. 348/615, 348/559, 558, 526, 527, 180, 189, 700, 701
See application file for complete search history.

(56) References Cited

U.S. PATENT DOCUMENTS

| 6,377,297 | B1 * | 4/2002 | Janko et al. .................. 348/180 |
| 6,377,299 | B1 | 4/2002 | Hamada | |
| 6,633,329 | B2 * | 10/2003 | Janko et al. .................. 348/180 |
| 6,906,743 | B1 | 6/2005 | Maurer | |
| 7,002,637 | B2 * | 2/2006 | Szybiak et al. ............... 348/700 |
| 2002/0105597 | A1 | 8/2002 | Janko et al. | |
| 2002/0196373 | A1 | 12/2002 | Szybiak et al. | |

FOREIGN PATENT DOCUMENTS

| EP | 1021040 A2 | 7/2000 |
| EP | 1107604 A2 | 6/2001 |
| JP | 2000331253 A | 11/2000 |
| KR | 20050072386 A | 7/2005 |

OTHER PUBLICATIONS

Anonymous, "SMPTE Standard for Television—SDTV Digital Signal/Data—Serial Digital Interface," SMPTE 259M-2006, The Society of Motion Picture and Television Engineers, White Plains, New York, Mar. 29, 2006, 14 pages.
Anonymous, "SMPTE Standard for Television—Component Video Signal 4:2:2—Bit-Parallel Digital Interface," SMPTE 125M-1995, The Society of Motion Picture and Television Engineers, White Plains, New York, Sep. 12, 1995, 18 pages.
Anonymous, "SMPTE Standard for Television—1.5 Gb/s Signal/Data Serial Interface," SMPTE 292-2006, The Society of Motion Picture and Television Engineers, White Plains, New York, Nov. 4, 2006, 13 pages.
Anonymous, "Recommendation ITU-R BT.656-4, Interfaces for digital component video signals in 525-line and 625-line television systems operating at the 4:2:2 level of Recommendation ITU-R BT.601 (Part A)," International Telecommuncations Union, Geneva, Switzerland, 1998, 16 pages.

* cited by examiner

*Primary Examiner*—David L Ometz
*Assistant Examiner*—Jean W Désir
(74) *Attorney, Agent, or Firm*—Hickman Palermo Truong & Becker LLP

(57) ABSTRACT

Methods and apparatuses to detect presence of undesirable video abnormalities during, for example, video ingest or playback. These undesirable characteristics may include an average picture level that is less than a preset threshold value, or static input, in which the content does not change over a significant number of frames. Detection of abnormalities results in an alarm to a system operator. Analysis and alarm may occur automatically during processing of video data streams. The same abnormalities may be detected during playback of the image data.

33 Claims, 5 Drawing Sheets

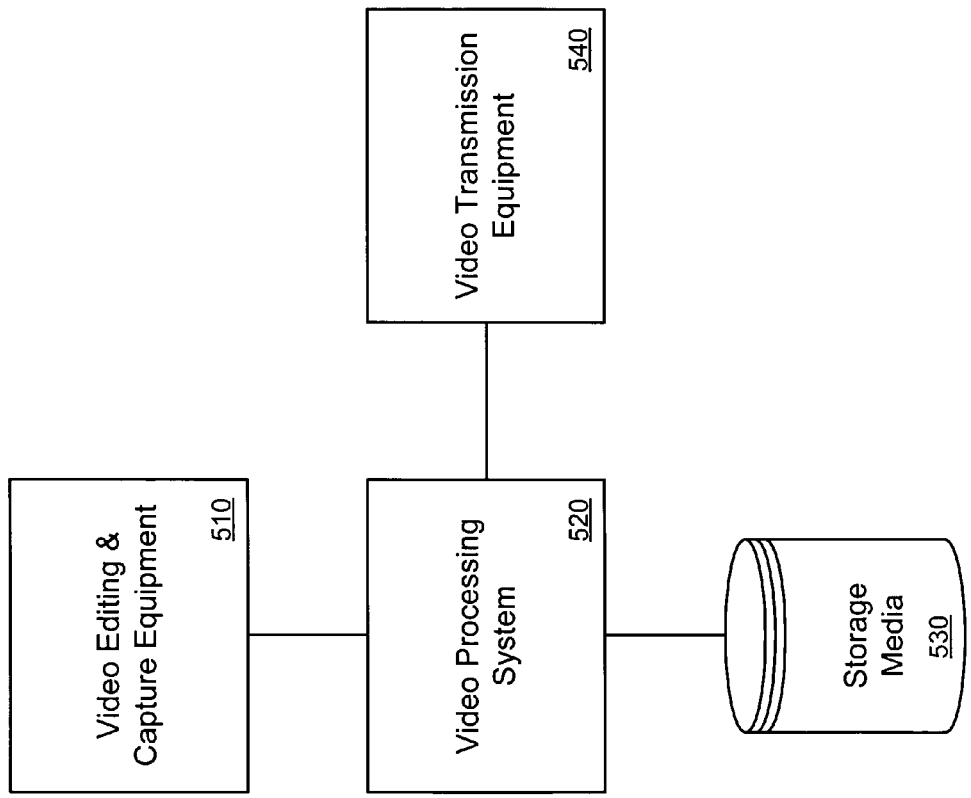

VIDEO ABNORMALITY DETECTION

TECHNICAL FIELD

Embodiments of the invention relate to video processing. More particularly, embodiments of the invention relate to techniques for detecting video abnormalities including, for example, extended black frames and/or freeze frame conditions.

BACKGROUND

Many tasks must be accomplished in order for video images to be transmitted for broadcast purposes. For example, a camera captures images that may be stored on a storage medium. The captured images may be transferred one or more times, copied, edited, or otherwise processed before displayed in final form. During this process, abnormalities may be introduced into the image data. These abnormalities may go unnoticed until final playback at which time an unsatisfactory viewing experience may be provided. Alternatively, a labor-intensive quality assurance strategy may be employed in an attempt to avoid abnormalities, which nay delay final playback and increase cost of providing the final playback.

SUMMARY

In one embodiment, luminance data for pixels in an image frame are compared to a threshold luminance value to determine whether a luminance threshold condition is met for the frame. The number of consecutive frames for which the luminance fails to exceed the threshold met is counted. A human-observable condition is generated if this count exceeds a frame-count threshold.

In another embodiment, luminance values are compared to corresponding luminance values of pixels from preceding frames in order to determine whether a relative motion has occurred between the frames. The number of consecutive frames for which no notion has occurred is counted. A human-observable condition is generated if this count exceeds a frame-count threshold.

BRIEF DESCRIPTION OF THE DRAWINGS

The invention is illustrated by way of example, and not by way of limitation, in the figures of the accompanying drawings in which like reference numerals refer to similar elements.

FIG. 5 is a block diagram of one embodiment of a system for gathering, processing, storing, editing and/or transmitting video data.

DETAILED DESCRIPTION

Figure 1:
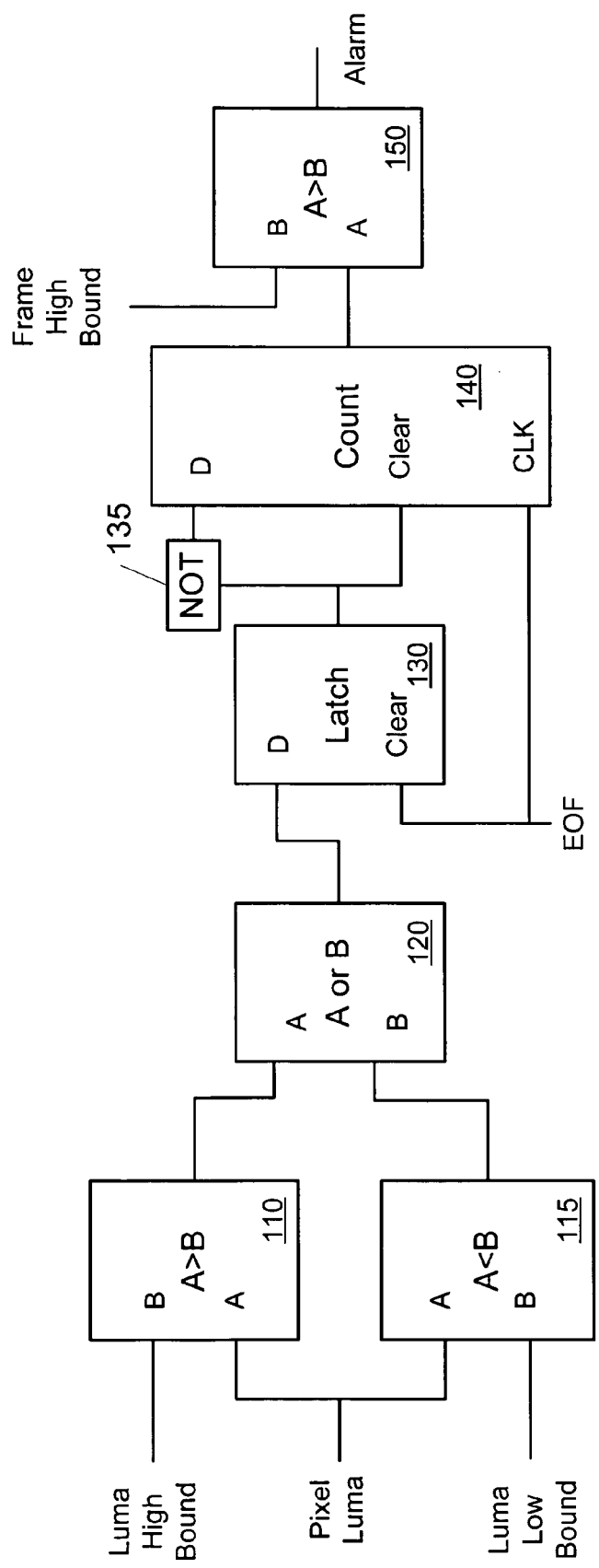
FIG. 1 is a block diagram of one embodiment of components to detect a black-screen condition.

In the following description, numerous specific details are set forth. However, embodiments of the invention may be practiced without these specific details. In other instances, well-know circuits, structures and techniques have not been shown in detail n order not to obscure the understanding of this description.

Abnormalities that may occur in video image streams include, for example, a black (or blank) screen and a freeze frame condition where the same image is displayed for an extended period. Described herein are techniques to detect presence of undesirable video abnormalities during, for example, video ingest or playback. These undesirable characteristics may include, for example, an average picture level that is less than a preset threshold value, or static input (e.g., freeze frame condition), in which the content does not change over a significant number of frames. In one embodiment, detection of abnormalities results in an alarm (e.g., electronic message) to a system operator. Analysis and alarm (if triggered) may occur automatically during processing a video data streams. The same abnormities may be detected during playback of the image data.

In one embodiment, for blank screen detection, luminance data may be routed to an input of a comparator. A user-selected threshold value may be routed to the other input of the comparator. A counter (hardware or software) may be used to maintain a count of the number of frames for which the comparator output indicates that all luminance values in that frame are less than the threshold value. When the counter exceeds a user-supplied value an audible and/or visual indication may be generated.

In one embodiment, for static image detection video input may be stored a frame buffer during video input or vide output. For each subsequent frame, the absolute value of the difference between the luma and/or chroma values of corresponding areas of adjacent frames may be determined. The difference value may be compared to a user-supplied threshold value. A counter (hardware or software) may be used to maintain a count of the number of consecutive frames for which the difference value for all pixels falls between the threshold values. When the counter exceeds a user-supplied value an audible and/or visual indication may be generated.

The techniques described herein allow for automatic detection of video abnormalities. By providing automatic detection of the abnormalities, overall video playback quality may be increased with less expense than use of current techniques, which may require extensive human interaction. In one embodiment, automatic abnormality detection may be triggered, for example, any time that video images are transferred from one medium to another, or when real-time images are captured by an image capture device. An image capture device may include, for example, a camera (either video or still image), or any type of device that capture an image. In another embodiment, automatic abnormality detection may be triggered in response to user-specified conditions.

FIG. 1 is a block diagram of one embodiment of components to detect a blank screen condition. In on embodiment, the pixel data processed is limited to luminance data.

In one embodiment, pixel luminance data is provided to comparators 110 and 115, which may receive one or more threshold values (e.g., 0) to which the incoming pixel data may be compared. In one embodiment, a single threshold value is use and the output signal from comparator indicates whether the pixel luminance value is greater than or less than the threshold value.

In one embodiment black may be represented by a value of 0; however, black is not always represented by a value of 0. For example, in CCIR601, black is defined as 16(0×10 hex) in an 8-bit system and values of less than 16 are sub-black. Different values may be used in different (e.g., 10-bit) systems. These may appear as black on a display, but may provide editing functionality. In one embodiment, for purposes of detection of an all black frame, differentiation may be made between all black and all sub-black frames.

In another embodiment, comparator 110 may receive an upper bound value and comparator 115 may receive a lower bound value. The output value from comparator 110 may indicate whether the pixel luminance value is above the upper bound and the output value form comparator 115 may indicate whether the pixel luminance value is lower than the lower bound. When the pixel luminance value is between the upper and lower bonds the pixel may be considered black and when the pixel luminance value is not between the upper and lower bounds the pixel may be considered non-black.

Digital logic 120 may be coupled to receive the output from comparators 110 and 115. In one embodiment, digital logic 120 may generate an output that indicates whether the pixel value is considered non-black. Conceptually, the first two stages of the circuitry of FIG. 1 may function to detect whether or not the pixel may be considered non-black. The output of digital logic 120 may be input to latch 130, which may latch the output of digital logic 120 and be cleared by an end of frame (EOF) indicator.

The output signals from latch 130 may input to counter 140, which may count the number of frames in which all pixels are considered black. In one embodiment, the input (D) and "clear" to latch 130 in the third stage are qualified by the pixel clock. Counter 140 increments on the detection of an all-black frame, and clears on the detection of a frame containing non-black pixels. In an alternated embodiment, the number of black pixels may be counted to allow a user to specify a limit for the number of black pixels that would cause the frame to be counted as black. A similar analysis may also be applied to a region of a frame that is less than a full frame.

In one-embodiment, the "clear" input of counter 140 in the fourth stage may be synchronous to the end-frame clock. In one embodiment, the output of counter 140 may be input to comparator 150, which may compare the output of counter 140 with a frame threshold value. In one embodiment, if the output of counter 140 exceeds the frame threshold value, an alarm signal may be generated. The alarm signal may be any type of human-observable signal.

In another embodiment, there may be another path to clear the counter (not shown) so that after an alarm, the user can clear the counter. In one embodiment, the pixel luma values may be for active video, and do not include values from the horizontal interval (between the last displayed pixel of one video line and the first displayed pixel of the next video line) or vertical interval (between the last displayed video line of one frame and first displayed video line of the next frame). In an alternate embodiment, a user may be allowed to specify a different horizontal and vertical range.

Figure 2:
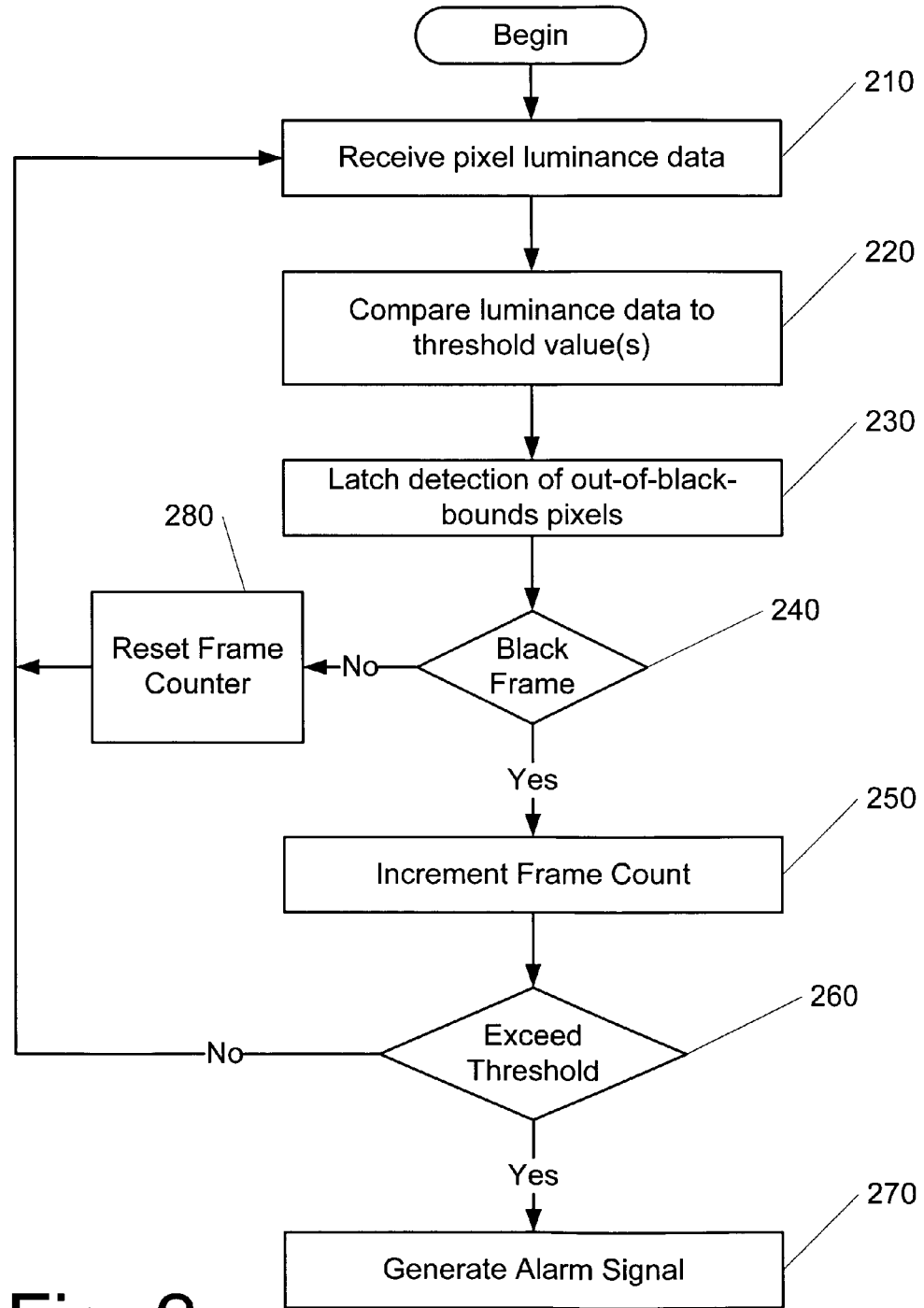
FIG. 2 is a flow diagram of one embodiment of a technique to detect a black screen.

FIG. 2 is a flow diagram of one embodiment of a technique to detect a black screen. The technique of FIG. 2 may be implemented in hardware, software, firmware or any combination thereof. In a color scheme where a pixel color is represented by one or more luminance values and one or more chroma value, detection of a black screen may be detected using only luminance data. Other schemes may use different combinations of luminance and/or color data to implement the techniques described herein. In the example describe below only luminance values are evaluated to determine whether a pixel is black.

In one embodiment, pixel luminance data may be received, 210. The luminance data may be received during the process of video playback, during the process of transferring pixels from one medium (e.g., video tape) to another medium (e.g., digital storage). The received luminance data may be compared to one or more threshold values, 220. On one embodiment, the one or more threshold values may be used to determine whether the pixel should be considered "black". That is, a range of luminance values may be considered black. In one embodiment, the range may be based on user-provided values.

The number of black pixels in a frame may be counted, 23. If enough pixels in a frame are considered black, the frame may be considered black. The threshold for number of pixels required for a frame to be considered black may be user selectable. For example, a single non-black pixel may be enough to consider the frame non-blank. Other thresholds may also be used, for example, 99% of pixels, 98% of pixels, etc.

If the frame is not considered black, 240, the frame counter may be reset, 280, and a subsequent frame may be processed in the same manner, 210, 220, 230. If the frame is considered black, 240, a frame count may be incremented, 250. The frame count may be maintained by either hardware of software. In one embodiment, when a non-black frame is detected the counter may be reset. That is, the counter may be used to count consecutive black frames. Presence of a non-black frame will clear the counter.

In one embodiment, if the number of black frames equals or exceeds a threshold, 260, an alarm signal may be generated, 270. The alarm signal may be any type of human-observable signal that may indicate an error condition. For example, the alarm signal may be an electronic message (e.g., electronic mail message, dialog box, flashing screen, display of a message) or any other type of indicator (e.g., flashing light, sound). In one embodiment, if the number of black frames does not exceed the threshold, a subsequent frame may be analyzed in the same manner.

Figure 3:
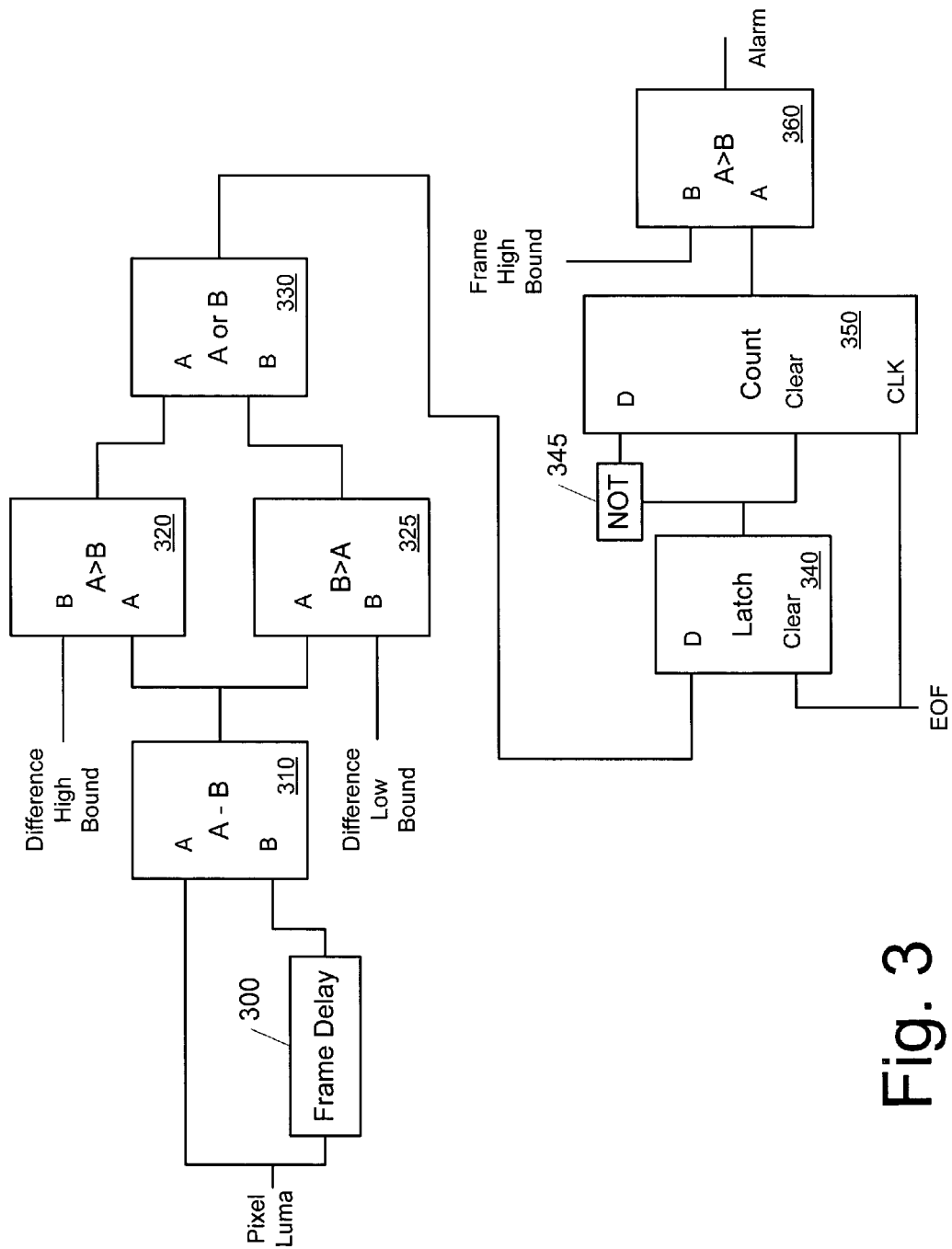
FIG. 3 is a block diagram of one embodiment of components to detect a freeze frame condition.

FIG. 3 is a block diagram of one embodiment of components to detect a freeze frame condition. Pixel data for an image frame may be received in any appropriate format. In one embodiment, the format includes luminance and chroma values. The incoming pixel data may be provided to digital logic 310 for comparison to pixel data at the corresponding position in a frame delayed in any manner known in the art by frame delay 300. The delay may be provided by, for example, a frame buffer. In one embodiment, digital logic 310 may determine a difference in color values between corresponding pixels in two frames.

The pixel data may be received during the process of video capture, video playback, during the process of transferring pixels from one medium (e.g., video tape) to another medium (e.g., digital storage). The received pixel data may be compared to one or more threshold values (e.g., a threshold value, an upper and a lower bound). In one embodiment, the one or more threshold values may be used to determine whether the pixel matches a corresponding pixel in an adjacent frame. In one embodiment, a user-selectable range of pixel values may be considered matching based, at least in part on the one or more threshold values.

In one embodiment, pixel color difference data is provided to comparators 320 and 325, which may receive one or more difference threshold values to which the incoming pixel color difference data may be compared. In one embodiment, a single threshold value is used and the output signal from comparator indicates whether the pixel luminance value is greater than or less than the threshold value.

In another embodiment, comparator 320 may receive an upper bound value and comparator 325 may receive a lower bound value. The output value from comparator 320 may indicate whether the pixel color difference value is above the upper bound and the output value from comparator 325 may indicated whether the pixel color difference value is lower than the lower bound. When the pixel color difference value is between the upper and lower bonds the two pixels may be considered the same and when the pixel color difference value is not between the upper and lower bounds the two pixels may be considered different.

Digital logic 330 may be coupled to receive the output from comparators 320 and 325. In one embodiment, digital logic 330 may generated an output that indicates whether the two pixels value are not considered the same. The output of digital logic 330 may be input to latch 340, which may latch the output digital logic 330 and be cleared by the EOF indicator. In one embodiment the output of latch 340 may be inverted by inverted 345.

The output signals and the inverted output signals from latch 340 may input to counter 350, which may count the number of pixels that are considered the same between the frames. In an alternate embodiment, the number of frames in which all pixels are considered the same may be counted to allow a user to specify a limit for the number of contiguous frames of this type.

In one embodiment, the "clear" input of counter 350 may be synchronous to the end-frame clock. In one embodiment, the output of counter 350 may be input to comparator 360, which may compare the output of counter 350 with a frame threshold value. In one embodiment, if the output of counter 350 exceeds the frame threshold value, an alarm signal may be generated. The alarm signal may be any type of human-observable signal.

In another embodiment, there may be another path to clear the counter (not shown) so that after an alarm, the user can clear the counter. In one embodiment, the pixel luma values may be for active video, and do not include values from the horizontal interval (between the last displayed pixel of one video line and the first displayed pixel of the next video line) or vertical interval (between the last displayed video line of one frame and first displayed video line of the next frame). In an alternative embodiment, a user may be allowed to specify a different horizontal and vertical range.

Figure 4:
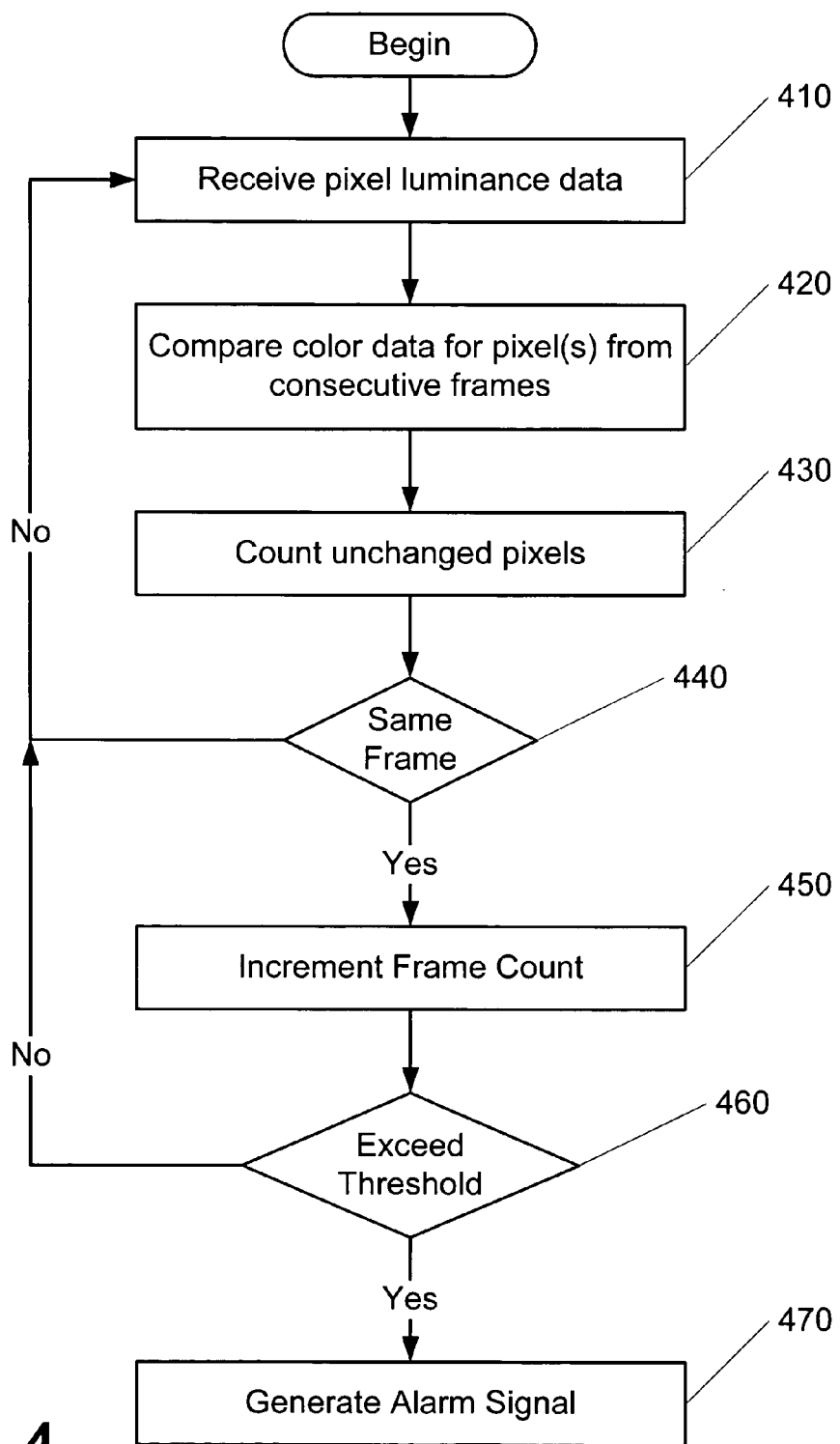
FIG. 4 is a flow diagram of one embodiment of a technique to detect a freeze frame condition.

FIG. 4 is a flow diagram of one embodiment of a technique to detect a freeze frame condition. The technique of FIG. 4 may be implemented in hardware, software, firmware or any combination thereof. Any color scheme known in the art may be used to represent pixels.

In one embodiment, pixel color data for pixels from consecutive frames may be received, 410. The pixel color data may be received from two sources, for example, a source of incoming image data and a frame buffer.

The color data may be received during the process of video playback, during the process of transferring pixels from one medium (e.g., video tape) to another medium (e.g., digital storage). The difference in color data between corresponding pixels from consecutive frames may be determined, 420. In one embodiment, an absolute difference between pixel color values may be determined.

In one embodiment, the one or more threshold values may be used to determine whether the pixel should be considered the same. That is, a range of difference in color values may be considered the same. In one embodiment, the range maybe based on user-provided values. The number of pixels that are considered the same between frames may be counted, 430. If enough pixels in a frame are considered the same, the frame may be considered the same as frame to which is it being compared. The threshold for number of pixels required to be the same for a frame to be the same may be user selectable. For example, a single different pixel may be enough to consider the frame different. Other thresholds may also be sued, for example, 99% of pixels, 98% of pixels, etc.

If the frame is not considered the same, 440, a subsequent frame may be processed in the same manner, 410, 420, 430. If the frame is considered the same, 440, a frame count may be incremented 450. The frame count may be maintained by either hardware or software. In one embodiment, when a different frame is detected the counter may be reset. That is, the counter may be used to count consecutive frames that are considered the same. Detections of a frame as significantly different from the previous frame will reset the counter.

In one embodiment, if the number of frames that are the same equals or exceeds a threshold, 460, an alarm signal may be generated, 470. The alarm signal may be any type of human-observable signal that may indicate an error condition. For example, the alarm signal may be an electronic message (e.g., electronic mail message, dialog box, flashing screen, display of a message) or any other type of indicator (e.g., flashing light, sound. In one embodiment, if the number of blank frames does not exceed the threshold, a subsequent frame may be analyzed in the same manner.

FIG. 5 is a block diagram of one embodiment of a system for gathering, processing, storing, editing and/or transmitting video data. Video data that may processed using the techniques described above can be gathered using any type of video capture and/or video editing equipment (510) known in the art. This may include, for example, video cameras, still image cameras, video tape recorders, optical media, etc.

The video data may be "ingested" by video processing system 520. Video processing system 520 may provide the processing techniques described herein. Video processing system 520 may also provide any other type of video processing know in the art, for example, editing, copying, etc. Video processing system 520 may store video data on one or more storage devices (generically labeled storage media 530) using any storage technology know in the art. Video processing system 520 may include one or more processing elements and one or more storage elements that allow video processing to be accomplished. Video processing system 520 may also include one or more input and/or output devices that allow a user to interact with the system.

Video processing system 520 may be coupled with video transmission equipment 540 to transmit selected portions of the video data using any technology know in the art. For example, video transmission equipment 540 may be equipment for broadcasting television signals that may include the video data to be transmitted. The transmission may be by wired or wireless protocols.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

comparing, for pixels in an image frame, a luminance value for each of the pixels to a pair of different threshold luminance values to determine whether a luminance threshold condition is met for the frame;

counting a number of consecutive frames for which the luminance threshold condition is met;

comparing the number of consecutive frames counted to a frame threshold value to determine whether a frame threshold condition is met; and generating a human-observable condition if the frame threshold condition is met, wherein the method is performed by one or more computing devices.

2. The method of claim 1 wherein the comparing the luminance values, counting the number of consecutive frames, comparing the number of consecutive frames and generating the human-observable condition are performed during playback of the image frames.

3. The method of claim 1 wherein the comparing the luminance values, counting the number of consecutive frames, comparing the number of consecutive frames and generating the human-observable condition are performed during transfer of the image frames from a first storage medium to a second storage medium.

4. The method of claim 1 wherein the comparing the luminance values, counting the number of consecutive frames, comparing the number of consecutive frames and generating the human-observable condition are performed during capture of real-time images by an image capture device.

5. The method of clam 1 wherein the comparing, for pixels in an image frame, a luminance value for each of the pixels to a pair of different threshold luminance values to determine whether a luminance threshold condition is met for the frame is performed for all pixels in the image frame.

6. The method of claim 1 wherein the luminance threshold value is user selectable.

7. The method of claim 6 wherein the threshold condition comprises the luminance value for a selected pixel being less than the luminance threshold value.

8. The method of claim 1 wherein the frame threshold value is user selectable.

9. The method of claim 1 wherein the frame threshold condition comprises the number of consecutive frames counted being greater than the frame threshold value.

10. The method of claim 1 wherein the human-observable condition comprises an electronic message.

11. An article of manufacture comprising a non-transitory computer-readable medium having stored thereon instructions that, when executed, cause one or more processors to:

compare, for pixels in an image frame, a luminance value for each of the pixels to a pair of different threshold luminance values to determine whether a luminance threshold condition is met for the frame;

count a number of consecutive frames for which the luminance threshold condition is met;

compare the number of consecutive frames counted to a frame threshold value to determine whether a frame threshold condition is met; and generate a human-observable condition if the frame threshold condition is met.

12. The article of claim 11 wherein the instructions that cause the one or more processors to compare the luminance values, count the number of consecutive frames, compare the number of consecutive frames and generate the human-observable condition are executed during playback of the image frames.

13. The article of claim 11 wherein the instructions that cause the one or more processors to compare the luminance values, count the number of consecutive frames, compare the number of consecutive frames and generate the human-observable condition are executed during transfer of the image frames from a first storage medium to a second storage medium.

14. The article of claim 11 wherein the instructions that cause the processors to compare, for pixels in an image frame, the luminance value for each of the pixels to the pair of different threshold luminance values to determine whether a luminance threshold condition is met for the frame is performed for all pixels in the image frame.

15. The article of claim 11 wherein the luminance threshold value is user selectable.

16. The article of claim 15 wherein the threshold condition comprises the luminance value for a selected pixel being less than the luminance threshold value.

17. The article of claim 11 wherein the frame threshold value is user selectable.

18. The article of claim 11 wherein the frame threshold condition comprises the number of consecutive frames counted being greater than the frame threshold value.

19. The article of claim 11 wherein the human-observable condition comprises an electronic message.

20. A method comprising:

comparing, for pixels in an image frame, color values to corresponding color values of a time-adjacent image to determine whether a color threshold condition exists;

counting a number of consecutive frames for which the color threshold condition exists;

comparing the number of consecutive frames for which the color threshold condition exists to a frame change threshold value to determine whether a frame change condition is met;

generating a human-observable condition if the frame change condition is met, wherein the color threshold condition comprises a predetermined number of pixels having a color difference between the color threshold value, wherein the color difference is determined using a pair of different threshold values, wherein the method is performed by one or more computing devices.

21. The method of claim 20 wherein color values comprise luminance values and chroma values.

22. The method of claim 21 wherein the color threshold value is user selectable.

23. The method of claim 20 wherein the frame change threshold value is user selectable.

24. The method of claim 20 wherein the human-observable condition comprises an electronic message.

25. An article of manufacture comprising a non-transitory computer-readable medium having stored thereon instructions that, when executed, cause one or more processors to:

compare, for pixels in an image frame, color values to corresponding color values of an adjacent image to determine whether a color-difference threshold condition exists;

count a number of consecutive frames for which the color threshold condition exists;

compare the number of consecutive frames for which the color threshold condition exists to a frame change threshold value to determine whether a frame change condition is met;

generate a human-observable condition if the frame change condition is met, wherein the color threshold condition comprises a predetermined number of pixels having a color difference between the color threshold value, wherein the color difference is determined using a pair of different threshold values.

26. The article of claim 25 wherein color values comprise luminance values and chroma values.

27. The article of claim 25 wherein the color threshold value is user selectable.

28. The article of claim 25 wherein the frame change threshold value is user selectable.

29. The article of claim 25 wherein the human-observable condition comprises an electronic message.

30. A system comprising:
a storage medium;
video processing circuitry including one or more processors to execute instructions including instructions that, when executed, cause the one or more processors to automatically compare, for pixels in an image frame, a luminance value for each of the pixels to a pair of threshold luminance values to determine whether a luminance threshold condition is met for the frame, to count a number of consecutive frames for which the luminance threshold condition is met, to compare the number of consecutive frames counted to a frame threshold value to determine whether a frame threshold condition is met, and to generate a human-observable condition if the frame threshold condition is met.

31. The system of claim 30 wherein the human-observable condition comprises an electronic message.

32. A system comprising:
a storage medium;
video processing circuitry including one or more processors to execute instructions including instructions that, when executed, cause the one or more processors to automatically compare, for pixels in an image frame, color values to corresponding color values of an adjacent image to determine whether a color threshold condition exists, count a number of consecutive frames for which the color threshold condition exists, compare the number of consecutive frames for which the color threshold condition exists to a frame change threshold value to determine whether a frame change condition is met, and generate a human-observable condition if the frame change condition is met, wherein the color threshold condition comprises a predetermined number of pixels having a color difference between the color threshold value, wherein the color difference is determined using a pair of different threshold values.

33. The system of claim 32 wherein the human-observable condition comprises an electronic message.

* * * * *